US006902323B2

(12) United States Patent
Chen

(10) Patent No.: US 6,902,323 B2
(45) Date of Patent: *Jun. 7, 2005

(54) LOCKING DEVICE AND ITS RELATED ASSEMBLAGE

(75) Inventor: Lee-Long Chen, Taoyuan (TW)

(73) Assignee: Delta Electronics Inc., Taoyuan Hsien (TW)

( * ) Notice: Subject to any disclaimer, the term of this patent is extended or adjusted under 35 U.S.C. 154(b) by 64 days.

This patent is subject to a terminal disclaimer.

(21) Appl. No.: 10/338,747

(22) Filed: Jan. 9, 2003

(65) Prior Publication Data

US 2003/0103699 A1 Jun. 5, 2003

Related U.S. Application Data

(63) Continuation-in-part of application No. 09/704,405, filed on Nov. 2, 2000, now Pat. No. 6,695,481.

(51) Int. Cl.$^7$ .............................................. F16C 35/02
(52) U.S. Cl. ...................... 384/226; 384/428; 384/903; 403/326; 411/526
(58) Field of Search ............................... 384/114, 115, 384/119, 120, 107, 108, 111, 113, 226–246, 275, 276, 295, 296, 428, 440, 903; 403/52, 57, 71, 120, 132, 326–328; 411/517, 518, 519, 525, 526, 527; 417/423.7, 423.12; 310/90, 91

(56) References Cited

U.S. PATENT DOCUMENTS

| | | | | | |
|---|---|---|---|---|---|
| 3,121,583 A | * | 2/1964 | Damm | ..................... | 294/82.26 |
| 3,663,849 A | * | 5/1972 | Heob | .......................... | 384/425 |
| 5,390,397 A | * | 2/1995 | Kremer et al. | .............. | 411/517 |
| 6,318,976 B1 | * | 11/2001 | Hsieh | ..................... | 417/423.12 |

* cited by examiner

*Primary Examiner*—Thomas R. Hannon
(74) *Attorney, Agent, or Firm*—Birch, Stewart, Kolasch & Birch, LLP

(57) ABSTRACT

A locking device and its assemblage are provided for confining an object such as a shaft of a motor. The locking device is used to confine the shaft having an end with a recess portion having a defining surface to prevent the shaft from being displaced in an axial direction. The locking device is a geometrically closed-loop body having an opening, and having a flexibility so that the shaft will pass through the opening and the end of the shaft will thus be confined by the locking device while the force disappears. The locking device is free from contact with the recess portion of the shaft when the shaft is spinning. A simple process can be used to assemble and disassemble the locking assemblage.

25 Claims, 4 Drawing Sheets

LOCKING DEVICE AND ITS RELATED ASSEMBLAGE

The present invention is a Continuation-in-Part of application Ser. No. 09/704,405 filed on Nov. 2, 2000, now U.S. Pat. No. 6,695,481.

FIELD OF THE INVENTION

The present invention relates to a locking device and its related assemblage, and more particularly to a retaining ring for confining a shaft of a motor to prevent the shaft from being displaced in a direction.

BACKGROUND OF THE INVENTION

Motors are widely used in many fields such as CD-ROM or DC motor. In general, a shaft of motor is confined by a retaining ring to prevent the shaft from being displaced in an axial direction. FIG. 1A is a sectional view of the traditional assemblage for confining a shaft of the motor. The assemblage includes a bushing 12, a bearing 11, a shaft 10, and a retaining ring 13. A bushing cover 15 with an external screw thread is disposed in the bottom of bushing 12. The bushing 12 is used to accommodate therein the bearing 11, the shaft 10, and the retaining ring 13. A washer 14 supporting the shaft 10 is disposed on the bushing cover 15. FIG. 1B is a top view of the retaining ring 13 which is an annular plate structure having a gap 131. Because the retaining ring 13 has the gap 131 and a flexibility, the retaining ring 13 must be opened by an external force, thereby an end 102 of shaft 10 will pass through a hollow portion of the retaining ring 13 and a recess 101 of the shaft 10 will be confined by the retaining ring 13 while the end 102 passes through the hollow portion. The shaft 10 is tightly fastened by the retaining ring 13.

However, such a retaining ring still brings about the inconvenience of the assembling process. For example, users need to utilize an additional tool or applying an external force to open the retaining ring through the gap 131 and then telescope the retaining ring onto the recess 101 of the shaft 10 so as to tightly fasten the shaft. Further, the retaining ring will be easily deformed resulting from the frequent assembling/disassembling processes, and may generate the friction between the retaining ring and the bearing when the shaft is spinning. In addition, the altitude of the shaft is adjusted by the bushing cover 15. If the bushing cover is not closed hermetically, the leakage of lubricant will happen. Furthermore, the altitude of the shaft can not be easily controlled. Thus, it is desired to modify the design of the retaining ring.

Therefore, the present invention provides a practical device and its relative assemblage for obviating the disadvantages of the prior arts as described above.

SUMMARY OF THE INVENTION

An object of the present inventions is to provide a practical locking device and its relative assemblage for confining an object to prevent the object (e.g. the shaft of the motor) from being displaced in a direction.

According to the present invention, a locking device for confining the object having an end having a recess portion having a defining surface to prevent the object from being displaced in a direction, is a geometrically closed-loop body having an opening, and has a flexibility so that the object will pass through the opening when applying an external force on the shaft to temporarily deform the locking device, and the recess portion of the object will thus be confined by the locking device while the force disappears and will be free from the contact with the locking device.

In accordance with an aspect of the present invention, the opening has a defining periphery including at least one convex zone spaced from the defining surface of the recess portion with a first distance while the object is locked by the locking device, and at least one concave zone spaced from the defining surface of the recess portion with a second distance while the object is locked by the locking device. The first distance is shorter than the second distance. Preferably, the number of convex zones is two or three.

In accordance with another aspect of the present invention, the object is an elongate body having the end and the elongate body is a shaft.

In accordance with another aspect of the present invention, the direction is an axial direction of the shaft.

In accordance with another aspect of the present invention, the end of the object is suitably curved so as to smoothly pass through the opening.

In accordance with another aspect of the present invention, the geometrically closed-loop body is a plate structure which is a retaining ring.

In addition, the present invention also provides a locking assemblage which includes an object having an end having a recess portion having a defining surface, a locking device for confining the end of the object, and an integral holder for accommodating therein the locking device and the end of the object.

In accordance with another aspect of the present invention, the integral holder includes a holding body having a first chamber for accommodating the end of the object, and a second chamber for accommodating the locking device.

In accordance with another aspect of the present invention, the first chamber and second chamber communicate with each other and integrally formed together.

In accordance with another aspect of the present invention, the first chamber has a closed end and the second chamber has an open end.

In accordance with another aspect of the present invention, the recess portion is an annular groove formed around the end of the shaft.

In another preferred embodiment of the present invention, a locking assemblage includes an object having an end having a recess portion therein, a locking device for confining the object to prevent the object from being displaced in an axial direction, and a holder for accommodating therein the locking device and the end of the object.

In addition, the present invention also provides a holder which includes an elongate holding body having a first end, a second end, and a chamber to accommodate an end of an object and a locking device therein, in which the object is free from contact with the locking device. The first end is a closed bottom end and the second end is an open to end to enable the end of the object and the locking device to pass therethrough. The internal wall is integrally formed to the elongate holding body for forming the chamber, wherein the chamber has a stepped structure to thereby form a relatively small chamber for accommodating therein the end of the object and a relatively large chamber for accommodating therein the locking device. The stepped structure can be used to support the locking device.

In accordance with another aspect of the present invention, the holder further accommodates therein a washer to support thereon the shaft.

In accordance with another aspect of the present invention, the holder further accommodates therein a bearing which regulates the shaft to spin therein.

In accordance with another aspect of the present invention, the locking device is a retaining ring.

In accordance with another aspect of the present invention, the first end part and second end part are cylindrical.

In accordance with another aspect of the present invention, the elongate holding body is a bushing.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The present invention provides a locking device and its related assemblage. The locking device is used to confine an object having an end having a recess portion to prevent the object from being displaced in a direction. The locking device is a plate structure having an opening, and has flexibility so that the end of the object will pass through the opening when applying an external force on the shaft to temporarily deform the locking device, and the end of the object will thus be confined by the locking device while the applied force disappears. The opening has a defining periphery including at least one convex zone, each of which is spaced from the surface of the recess portion by a first distance while the object is locked by the locking device, and at least one concave zone, each of which is spaced from the surface of the recess portion by a second distance while the object is locked by the locking device. The first distance is shorter than the second distance. The locking assemblage includes an object having a recess portion, a locking device for confining the recess portion, and an integral holder for accommodating therein the object and the locking device.

Figure 1A:
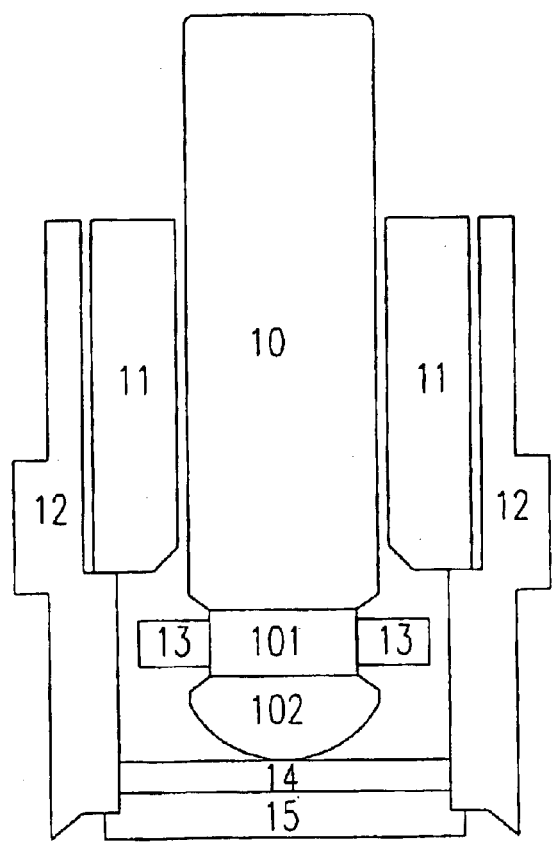
FIG. 1A is a longitudinally sectional view of a conventional locking assemblage for confining the shaft of the motor.
Figure 1B:
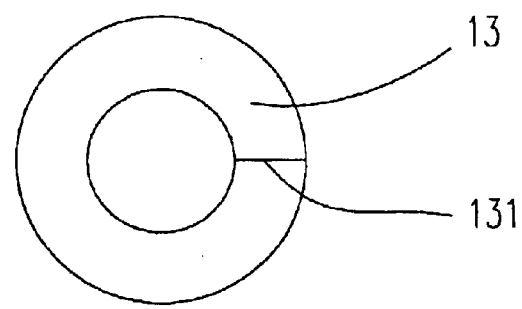
FIG. 1B is a top view of the conventional retaining ring.
Figure 2A:
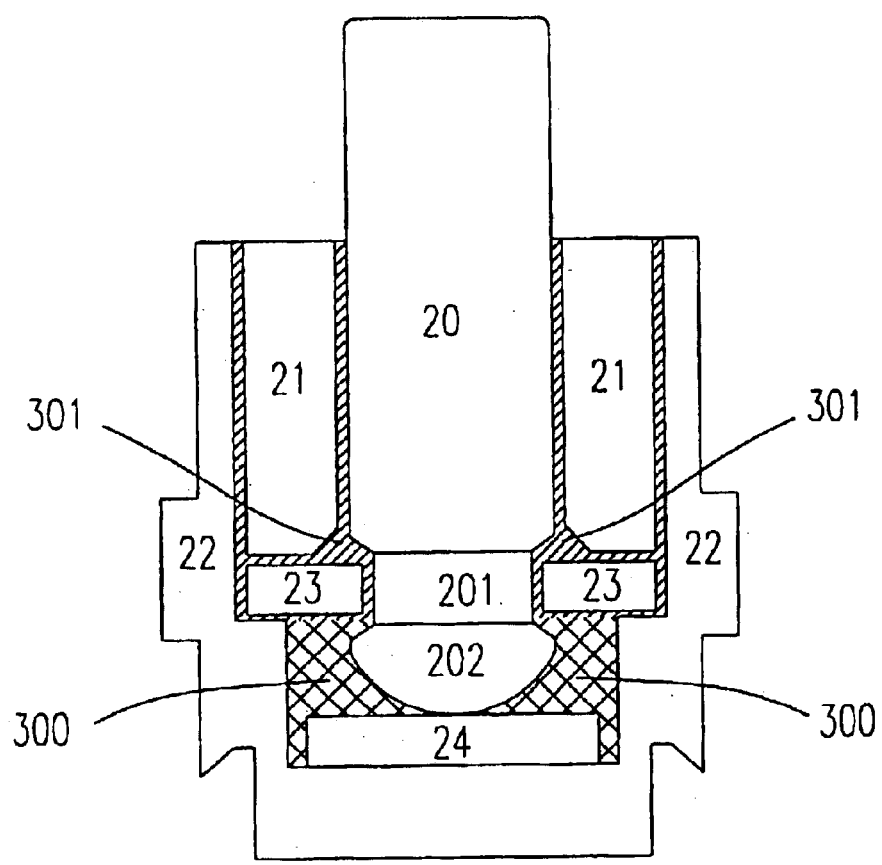
FIG. 2A is a sectional view of the preferred embodiment of a locking assemblage according to present invention.

The preferred embodiment of present invention, as shown in FIG. 2A, is a locking assemblage. A retaining ring 23 is used to confine the shaft 20 having an end 202 with a recess portion 201 to prevent the shaft 20 from being displaced in the axial direction. The retaining ring 23 is a plate structure having an opening, and has flexibility for allowing the shaft 20 to pass through the opening when applying an external force on the shaft to temporarily deform the retaining ring, and the recess portion 201 of the shaft 20 will thus be confined by the retaining ring 23 while the force disappears. The end 202 of the shaft has a curved surface to smoothly pass through the opening. The recess portion 201 has a defining surface in the end 202 of the shaft 20. The recess portion 201 is an annular groove formed around the end 202 of the shaft 20 which is not contacted with the retaining ring 23 when the shaft is spinning.

Figure 2B:
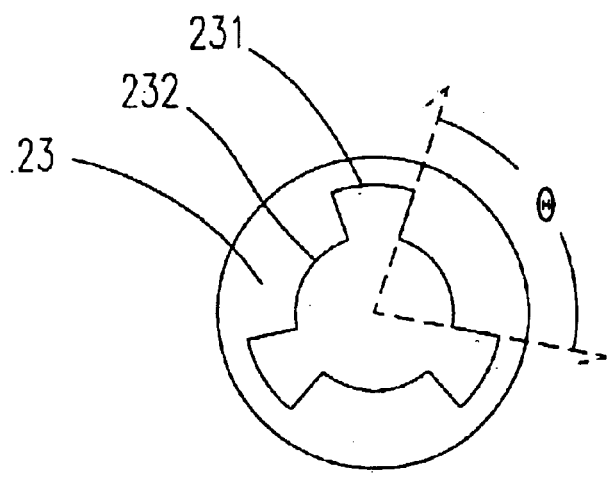
FIG. 2B is a top view of the first preferred embodiment of a locking device according to present invention.
Figure 2C:
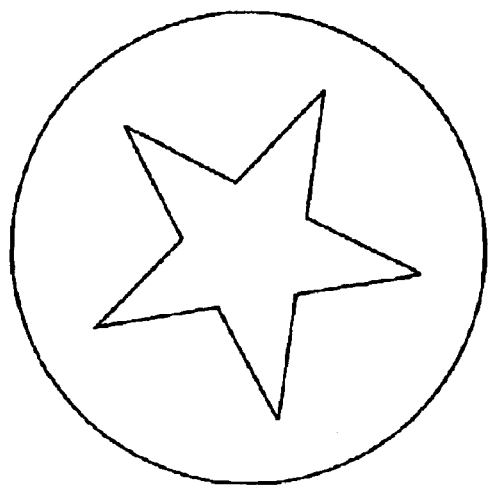
FIGS. 2C and 2D are top views of another preferred embodiments of a locking device according to present invention.
Figure 2D:
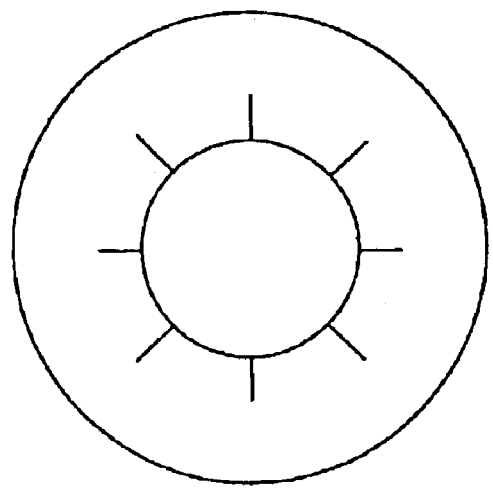
Figure 3A:
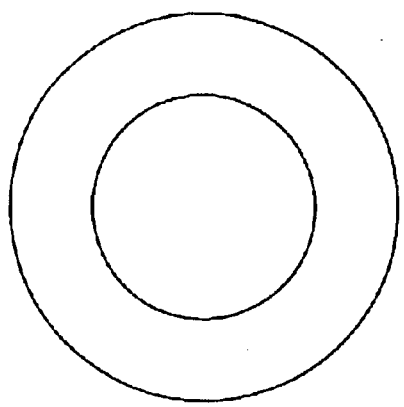
FIGS. 3A–3D are top views of another yet preferred embodiments of the locking device according to present invention.
Figure 3B:
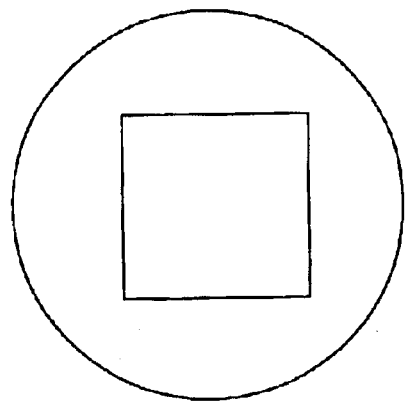
Figure 3C:
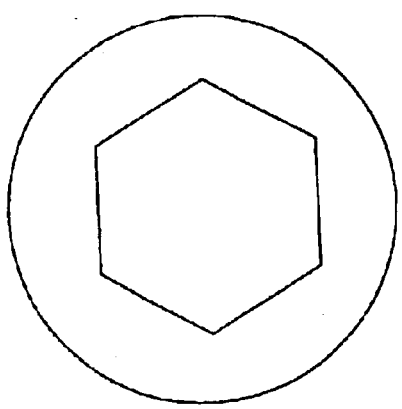
Figure 3D:
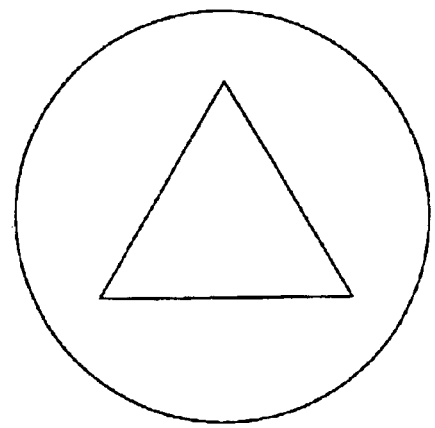

FIG. 2B shows that the opening has a defining periphery including three convex zones 232, each of which is spaced from the defining surface of the recess portion 201 with a first distance while the shaft 20 is locked by the retaining ring 23, and three concave zones 231, each of which is spaced from the defining surface of the recess portion 201 with a second distance while the shaft 20 is locked by the retaining ring 23. The first distance is shorter than the second distance. Alternatively, the opening of the locking device can also be designed as a starlike profile shown in FIG. 2C. Preferably, the periphery of the opening of the locking device is partially cut off to form a plurality of slits as shown in FIG. 2D.

In addition to the above-described embodiments, the locking device can also be designed as the structures shown in FIGS. 3A–3D. The opening of the locking device has a profile of a circular, triangular, rectangular, hexagonal, teethed or irregular shape.

Referring to FIG. 2A again, the locking assemblage includes a shaft 20 having an end 202 with a recess portion 201, a retaining ring 23 for confining the shaft 20, and an integral bushing 22 for accommodating the end 202 of the shaft 20 and the retaining ring 23 therein. The bushing 22 having an integral body has a first chamber 300 and a second chamber 301. The first chamber 300 which further accommodates the washer 24 for supporting the shaft 20 has a closed bottom end. The second chamber 301 has an open end and accommodates the bearing 21 which regulates the shaft 20 to spin therein. The first chamber 300 and the second chamber 301 communicate with each other. A stepped structure formed inside the bushing 22 is used to divide the internal space of bushing 22 into a relative small chamber and a relative large chamber, and the relative small chamber is the first chamber 300. The relative large chamber is the second chamber 301.

The present invention provides a simple process to assemble a locking device with the shaft of the motor. Firstly, the washer 24 is placed on the bottom of first chamber 300 of the bushing 22. Secondly, the retaining ring 23 is put on the bottom of the second chamber 301 and supported by the stepped structure. Thirdly, the bearing 21 is pressed into the second chamber 301. Finally, the shaft 20 is inserted into the central space of the bearing 21. An external force is applied upon the shaft 20 so as to enable the shaft 20 to pass through the opening of the retaining ring. The end 202 will thus be confined by the retaining ring 23 while the external force disappears. The novel locking assemblage aids in avoiding leakage of oil, provides a more precise altitude of the shaft 20, and greatly reduces the assembling time with needing any additional tool. Furthermore, the locking device of the present invention will not be worn and the friction between the locking device and the bearing can be reduced when the shaft is spinning so that it can be reused again. During the assembling process, it is unnecessary to utilize any additional tool to open the retaining ring such that the locking device of the present invention will not be deformed and can be easily assembled with and disassembled from the shaft.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A locking assemblage comprising:
    a shaft-like body having a recess portion at one end thereof;
    a locking device for passing therethrough said shaft-like body and retaining said recess portion of said shaft-like body therein to prevent said shaft-like body from being displaced in a direction thereof, wherein said locking device is flexible and has a close loop structure with an opening; and
    a holder having a bottom end and a top end for receiving said shaft-like body and said locking device from said top end, wherein the holder has a stepped structure formed therein for placing the locking device thereon;
    wherein an external force is exerted onto said shaft-like body for allowing said recess portion of said shaft-like body to pass through said opening and to be retained therein without contact with said locking device.

2. The assemblage of claim 1, wherein said opening of said locking device has a defining periphery which includes alternate convex and concave zones and defines a space allowing said recess portion to be retained therein without contact with said locking device.

3. The assemblage of claim 1, wherein said opening of said locking device has a profile selected from a group essentially consisting of circular, triangular, rectangular, hexagonal, teethed, starlike and irregular shapes.

4. The assemblage of claim 1, wherein said locking device is a plate structure.

5. The assemblage of claim 1, wherein said opening of said locking device has a plurality of slits formed on a defining periphery thereof.

6. The assemblage of claim 1, wherein said holder includes a first chamber with a closed bottom end for accommodating said end of said shaft-like body, and a second chamber for accommodating said locking device.

7. The assemblage of claim 6, wherein said first chamber and second chamber communicate with each other and are integrally formed together.

8. The assemblage of claim 7, wherein the stepped structure is formed between said first chamber and said second chamber for supporting the locking device.

9. The assemblage of claim 6 further comprising a washer disposed on said bottom end of said first chamber.

10. The assemblage of claim 1, wherein said shaft-like body has an end with a curved surface to be smoothly passed through said opening of said locking device.

11. The assemblage of claim 1, wherein said recess portion is an annular groove formed around an end of said shaft-like body.

12. A locking assemblage comprising:
    a shaft having a recess portion at one end thereof;
    a locking device for confining said shaft to prevent said shaft from being displaced in an axial direction, wherein said locking device is flexible and has a close loop structure with an opening; and
    a holder having a closed bottom end and an open top end for receiving said shaft and said locking device from said top end,
    wherein said shaft will pass through said opening by applying an external force thereon to enable said recess portion of said shaft to be retained in said locking device without contact with said locking device.

13. The assemblage of claim 12, wherein said opening of said locking device has a defining periphery which includes alternate convex and concave zones and defines a space for allowing said recess portion to be retained therein without contact with said locking device.

14. The assemblage of claim 12, wherein said opening of said locking device has a profile selected from a group essentially consisting of circular, triangular, rectangular, hexagonal, teethed and irregular shapes.

15. The assemblage of claim 12, wherein said locking device is a plate structure.

16. The assemblage of claim 12, wherein said opening of said locking device has a plurality of slits formed on a defining periphery thereof.

17. The assemblage of claim 12, wherein said holder includes a first chamber for accommodating said end of said shaft, and a second chamber for accommodating said locking device.

18. The assemblage of claim 17, wherein said first chamber and second chamber communicate with each other and are integrally formed together.

19. The assemblage of claim 17, wherein there is a stepped structure formed between said first chamber and said second chamber for supporting the locking device.

20. The assemblage of claim 12, wherein said recess portion is an annular groove formed around an end of said shaft.

21. A locking assemblage, comprising:
    a shaft-like body having a longitudinal axis and a recess portion; and
    a flexible retaining body having a close loop structure with an opening for enabling said shaft-like body to pass therethrough and retaining said recess portion of said shaft-like body therein to prevent said shaft-like body from displacing in a direction of said longitudinal axis without contact with said flexible retaining body unless said flexible retaining body is urged to move in said direction of said longitudinal axis, wherein the flexible retaining body comprises uniform thickness.

22. The locking assemblage of claim 21, wherein said opening has a defining periphery which includes alternate convex and concave zones and defines a space for allowing said recess portion to be retained therein without contact with said retaining body when said shaft-like body is spinning.

23. The locking assemblage of claim 21, wherein said opening has a profile selected from a group essentially consisting of circular, triangular, rectangular, hexagonal, teethed and irregular shapes.

24. The locking assemblage of claim 21, wherein said retaining body is a plate structure.

25. The locking assemblage of claim 21, wherein said opening of retaining body has a plurality of slits formed on a defining periphery thereof.

* * * * *